US006308297B1

(12) United States Patent
Harris

(10) Patent No.: US 6,308,297 B1
(45) Date of Patent: Oct. 23, 2001

(54) METHOD AND APPARATUS FOR VERIFYING MEMORY ADDRESSES

(75) Inventor: Jeremy G Harris, Chalfont St Giles (GB)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/118,462

(22) Filed: Jul. 17, 1998

(51) Int. Cl.$^7$ ............................... G11C 29/00; G06F 7/02
(52) U.S. Cl. ............................. 714/773; 714/819
(58) Field of Search ............................. 714/718, 730, 714/702, 763, 768, 773, 805, 819; 365/195, 185.11, 185.22; 711/152, 163, 5

(56) References Cited

U.S. PATENT DOCUMENTS

| | | | |
|---|---|---|---|
| 5,173,905 | * 12/1992 | Parkinson et al. | 714/763 |
| 5,291,584 | * 3/1994 | Challa et al. | 395/500 |
| 5,392,302 | * 2/1995 | Kemp et al. | 714/805 |
| 5,463,635 | * 10/1995 | Kumazawa et al. | 714/718 |
| 5,615,148 | * 3/1997 | Yamamura et al. | 365/185.11 |
| 5,675,540 | * 10/1997 | Roohparvar | 365/185.22 |
| 5,805,510 | * 9/1998 | Miyakawa et al. | 365/185.11 |
| 5,978,953 | * 11/1999 | Olarig | 714/768 |
| 5,991,517 | * 11/1999 | Harari et al. | 714/3 |
| 6,052,781 | * 4/2000 | Weber | 713/200 |

* cited by examiner

Primary Examiner—Albert Decady
Assistant Examiner—Shelly A Chase
(74) Attorney, Agent, or Firm—O'Melveny & Myers LLP

(57) ABSTRACT

An integrated solid state memory device includes addressable memory locations. In use, an address port receives an address identifying at least one memory location and associated verification information (e.g., parity or error correcting information) for verifying the address. Decoding logic is responsive to a received address to decode the address and verification logic is responsive to a received address and a received verification portion to verify the received address. By providing address verification within a solid state memory device, it is possible to ensure a higher security of operation of a computer system incorporating such a memory device, as errors which might develop, for example, between a memory controller and individual memory devices can be detected. As well as being useful for normal operation, such a memory device facilitates checking of the operating limits of a system as bus speeds and memory access speeds increase. The verification logic can be configured, for example, to prevent access to or modification of the memory locations and/or in the case of a read operation, to prevent output from the device of the content of an addressed memory location where address verification is negative. An error signal could also be generated where address verification is negative. The error signal could be used simply to report a fault or to cause a retry of the addressing operation. Where the memory device includes separate memory banks, the address verification could be performed at one or more levels within the device, for example down to the memory bank level.

41 Claims, 7 Drawing Sheets

METHOD AND APPARATUS FOR VERIFYING MEMORY ADDRESSES

BACKGROUND OF THE INVENTION

This invention relates to memory address checking in computer systems.

Computer systems typically include mechanisms for ensuring the correctness of data, for example through the use of parity and error correction codes. Such mechanisms are often applied to the data paths between processing elements, I/O elements and main memory. Indeed, it is common for parity or error correction codes to be stored along with data in main memory. As a result of this the parity or error correction codes are available to check the validity of data when subsequently read from memory. Accordingly, it is possible for the validity and correctness of data to be verified at all stages along the data path from the processing elements to memory and back again.

It is also known to employ parity or error correction codes for ensuring the correctness of addresses on an address bus. However, the protection provided by the use of such codes for checking addresses effectively stops at the entry to the memory subsystem, such that address errors within the memory subsystem can go undetected.

Accordingly, an aim of the present invention is to improve the degree of security of memory operation in a computer system.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with one aspect of the invention, there is provided a solid state memory device including a plurality of addressable memory locations. During operation of the memory device, an address port receives an address identifying at least one memory location and associated verification information for verifying the address. Decoding logic is connected (directly or indirectly) to the address port and is operable to respond to an address received at the address port to decode the address. Verification logic is connected (directly or indirectly) to the address port and is operable to respond to an address and associated verification information received at the address port to verify the received address.

By providing address verification within a solid state memory device, it is possible to extend the verification of addresses into the memory devices themselves. Previously, address verification was only possible externally to solid state memory devices. In this manner, the addresses can be checked from the point of encoding to the point of decoding within a computer system.

By providing a memory device in accordance with the invention it is possible to ensure a higher security of operation of a computer system incorporating such a memory device, as errors which might develop or be present due to incorrect assembly between a memory controller and individual memory devices can be detected. Also, an embodiment of the invention can be used to verify overall reliability of a system. For example, it would be possible to strobe a memory chip at higher and higher clock rates until a fault is detected, for example due to capacitive or other effects inside or between the memory system devices, thus establishing reliable operating parameters for a memory system and a computer system incorporating such memory devices.

The verification logic can be configured in different ways. For example, it can be configured to be operable to prevent access to the memory locations where address verification is negative. Alternatively, or in addition, in the case of a read operation the verification logic is operable to prevent output from the device of the content of an addressed memory location where address verification is negative. Alternatively, or in addition, in the case of write operation the verification logic is operable to prevent modification of the content of an addressed memory location where address verification is negative. It can also be configured to be operable to inhibit the output of the decoding logic where address verification is negative. Generally, however, the verification logic is operable to prevent modification of any memory location where address verification is negative.

Preferably, the verification logic is operable to indicate an error where address verification is negative. More preferably, the memory device comprises an error output for returning an error signal where address verification is negative. The error signal can be used simply to report a fault. Alternatively, it can be used to cause a memory controller to retry a memory addressing operation.

The verification information could comprise an error detecting code such as, for example, one or more parity bits. Alternatively, or in addition, the verification information could comprise an error correcting code. In this latter case, the verification logic could be configured to correct an invalid address based on the error correcting code, where possible.

Preferably, the address port comprises a plurality of device contacts for connection to a bus or to control lines to a memory controller. A data port can be provided for receiving write data associated with a received address and a data register can be provided for holding write data pending verification of the received address. Where the data is also associated with data verification information, the verification logic can be operable to verify that data and to prevent writing of data to the memory where verification is negative.

In a preferred implementation, the memory device is an integrated memory chip. The integrated memory device can comprise a plurality of memory banks. The verification and decoding logic can be provided at one or more levels within the device, for example down to the memory bank level.

In accordance with another aspect of the invention, there is provided a solid state memory device comprising a plurality of addressable memory locations, a data port for receiving data for storage in at least one memory location including associated data verification information for verifying the data, and verification logic responsive to received data and data verification information to verify the received data and to prevent storage of that data where verification is negative. Thus controlled storage can be made dependent upon the validity of received data.

In accordance with a further aspect of the invention, there is provided a computer system. The computer system includes a processing unit, a bus connected to the processing unit and including address lines and verification information lines for an address and associated verification information, a memory controller connected to the bus and at least one solid state memory device as described above and connected to the memory controller. The bus can include an error line for an error signal or provision for a negative acknowledgement indicative of a negative address verification at the memory device.

In accordance with a further aspect of the invention, there is provided a method of addressing a memory location within a solid state memory device comprising: receiving an address at the memory device with associated verification information for verifying the address; and verifying the received address within the memory device.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF THE PREFERRED EMBODIMENTS

Figure 1:
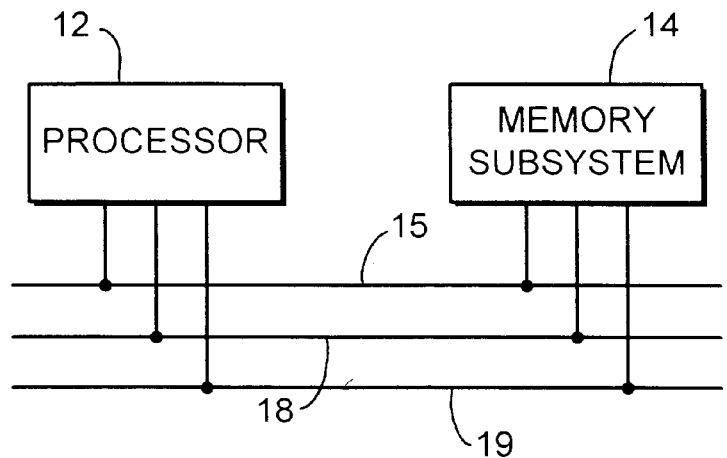
FIG. 1 is a schematic overview of a computer system.

FIG. 1 is a schematic overview of a computer system incorporating an embodiment to the present invention. FIG. 1 illustrates a processor 12 and a memory subsystem 14. Connecting the processing 12 and the memory subsystem 14 is a bus structure comprising an address bus 15 and a data bus 19 with, in addition, an error line 18. The address bus 15 and the data bus 19 are used for passing addresses and data between the processor and the memory subsystem and other components (not shown) connected thereto. The error line 18 is for reporting an address error as will be explained in more detail later. It should be noted that the error line 18 is optional. It will be appreciated that the computer system would typically include further components, not shown, including, for example, a keyboard, other input devices, a display, back-up storage and communication devices.

Figure 2:
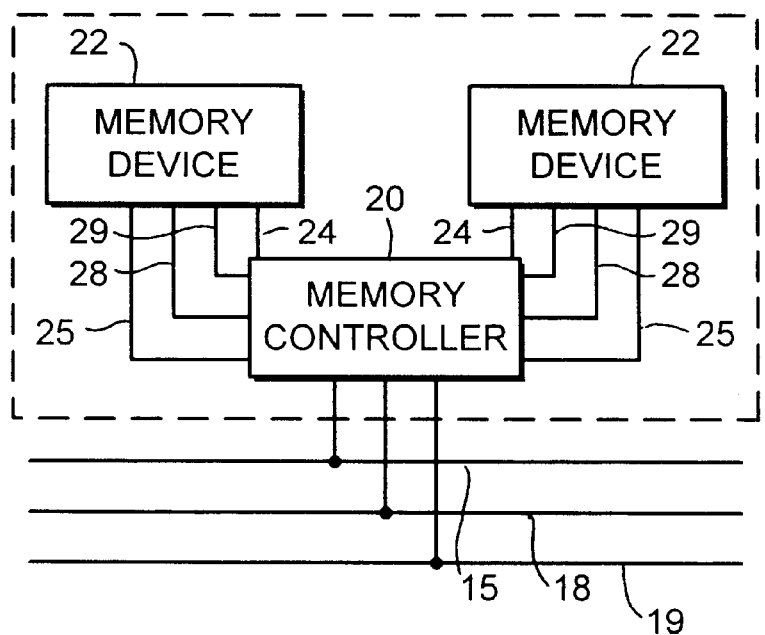
FIG. 2 is a schematic overview of a memory subsystem.

FIG. 2 is a schematic overview of an example of a memory subsystem 14 of an embodiment of the invention. As shown in FIG. 2, the memory subsystem 14 includes a memory controller 20 connected to a memory subsystem bus, including an address bus 25, a data bus 29, timing and control lines 24 and an error line 28. The address bus 25 is for passing addresses from the memory controller to individual memory devices 22. The data bus 29 is for passing data between the memory controller and the memory device in both directions. The timing and control lines 24 are for passing timing information and control information from the memory controller 20 to the individual memory devices 22. The error line 28 is an optional line for passing an error signal from a memory device 22 to the memory controller 20.

Figure 3:
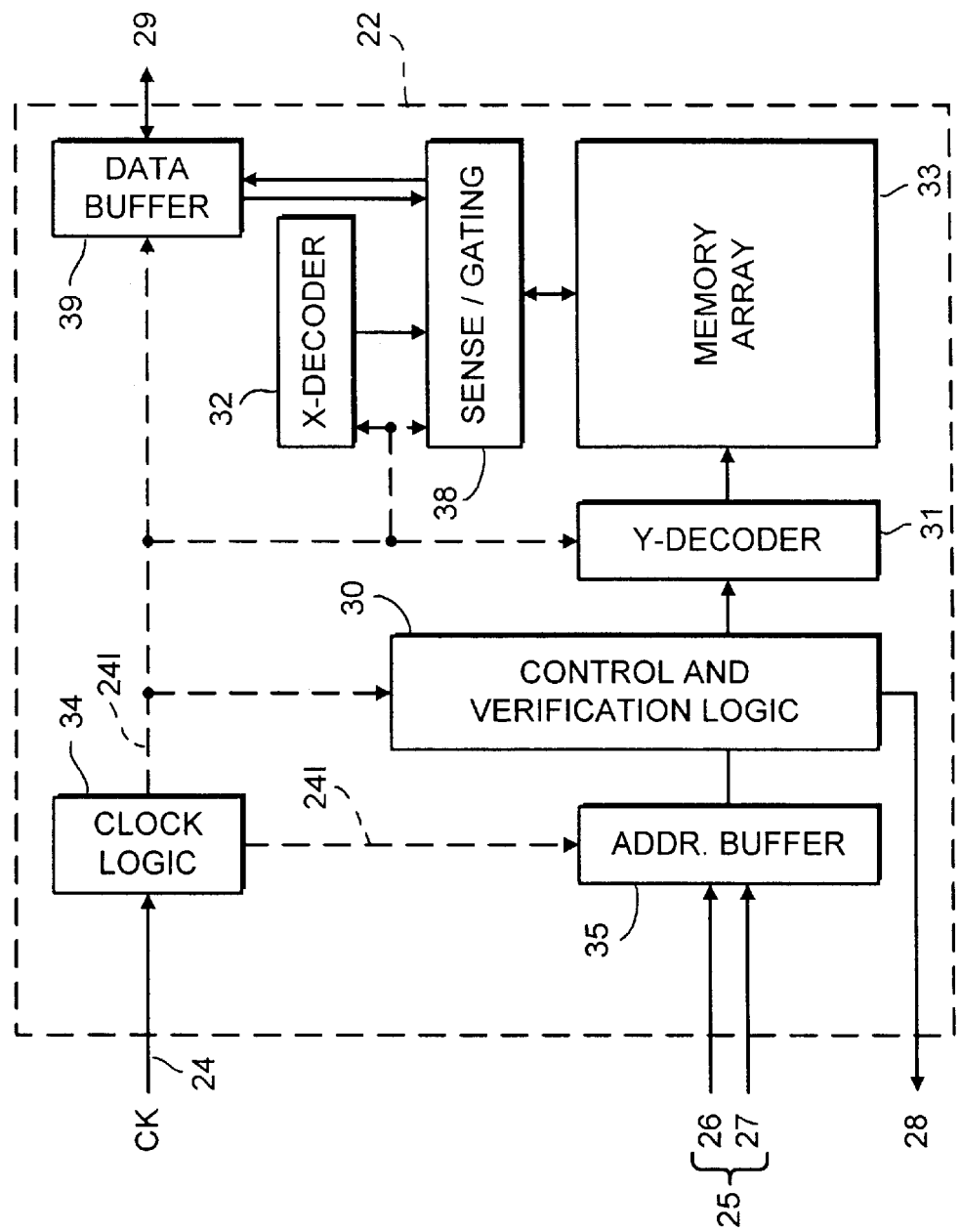
FIG. 3 is a schematic overview of an example of a memory device according to the invention.

FIG. 3 is a schematic overview of an example of a memory device 22 in accordance with the present invention. As shown in FIG. 3, the address bus 25 includes an address portion 26 and a verification portion 27. The address portion 26 includes the address for addressing a memory location within a memory array 33. The verification portion 27 contains verification information for verifying the correctness of the address. The verification information could, for example, be in the form of error correcting codes (ECC) or error detecting codes (EDC). An example of an EDC is the use of one or more parity bits. However, the verification information is not limited to these examples and could take some other form. It will be appreciated that there are typically a plurality of address lines 26 (for example 7, 8, 9, 16, 32, etc. lines), and the verification information lines 27 may also comprise a plurality of bits (for example 1, 2, 3, etc. bits). It will also be appreciated that an address may comprise more than one part supplied on the address bus 25 at separate times under the control of timing information supplied on the clock lines 24. Clock logic 34 is responsive to the clock signals supplied on the clock lines 24 for generating internal clock signals for controlling the various elements of the memory device as represented by the dotted clock lines 24I.

When an address is supplied to the memory device 22, it is initially buffered in an address buffer, or address register 35. Similarly, with a write operation to memory, write data from the data bus 29 is buffered in a data buffer 39 pending addressing of the memory location within the memory 33.

The address and verification information is supplied from the address buffer 35 to control and verification logic 30. The control and verification logic 30 is arranged to perform conventional verification operations on the address using parity or other EDC, ECC, or other verification information. If verification is positive and the address checks out, the address information is passed to the row (Y) decoder 31 and column (X) decoder 32. The Y decoder 31 and X decoder 32 decode the input address in order to address a specific location (or group of locations) within the memory array 33.

In the case of a write operation, the control and verification logic also causes the data buffer to supply the data to the memory array 33 via sense and gating circuitry including sense amplifiers and gating logic 38 in accordance with the correct timing for writing data to the memory array. In the case of a read operation, the addressing of the memory array, along with appropriate sensing of the memory array, causes data to be output from the addressed location or locations to the data buffer 39 via the sense and gating circuitry 38, from which it can then be output over the data bus 29.

If the verification is negative (i.e. there is an error in the address or verification information), then the address information from the lines 26 is not passed to the Y decoder 31 and the X decoder 32. Optionally an error signal can be supplied to the error line 28 for supply to the memory controller and/or to the processor 10. The error signal could be used simply to indicate the presence of the data error, or could be used to cause the memory controller to retry addressing of the memory device 22.

In the case where the verification information is ECC information, the control and verification logic could be arranged, in a conventional manner, to attempt correction of the address information. If this is possible, then addressing of the memory location or locations within the memory array 33 by means of the Y decoder 31 and X decoder 32 can proceed. If correction of the address information is not possible, then the addressing of the memory array 33 by the Y decoder 31 and X decoder 32 is inhibited, and optionally an error signal 28 is generated.

It should be noted that FIG. 3 is a schematic overview of a memory device 22, and details typically found in a memory device have not been shown in FIG. 3. For example, the control and verification logic receives a data signal from the line 29 indicating whether the data operation is a write or a read operation. Also details of the memory array including the appropriate sense and control structures is not shown in FIG. 3.

Figure 4:
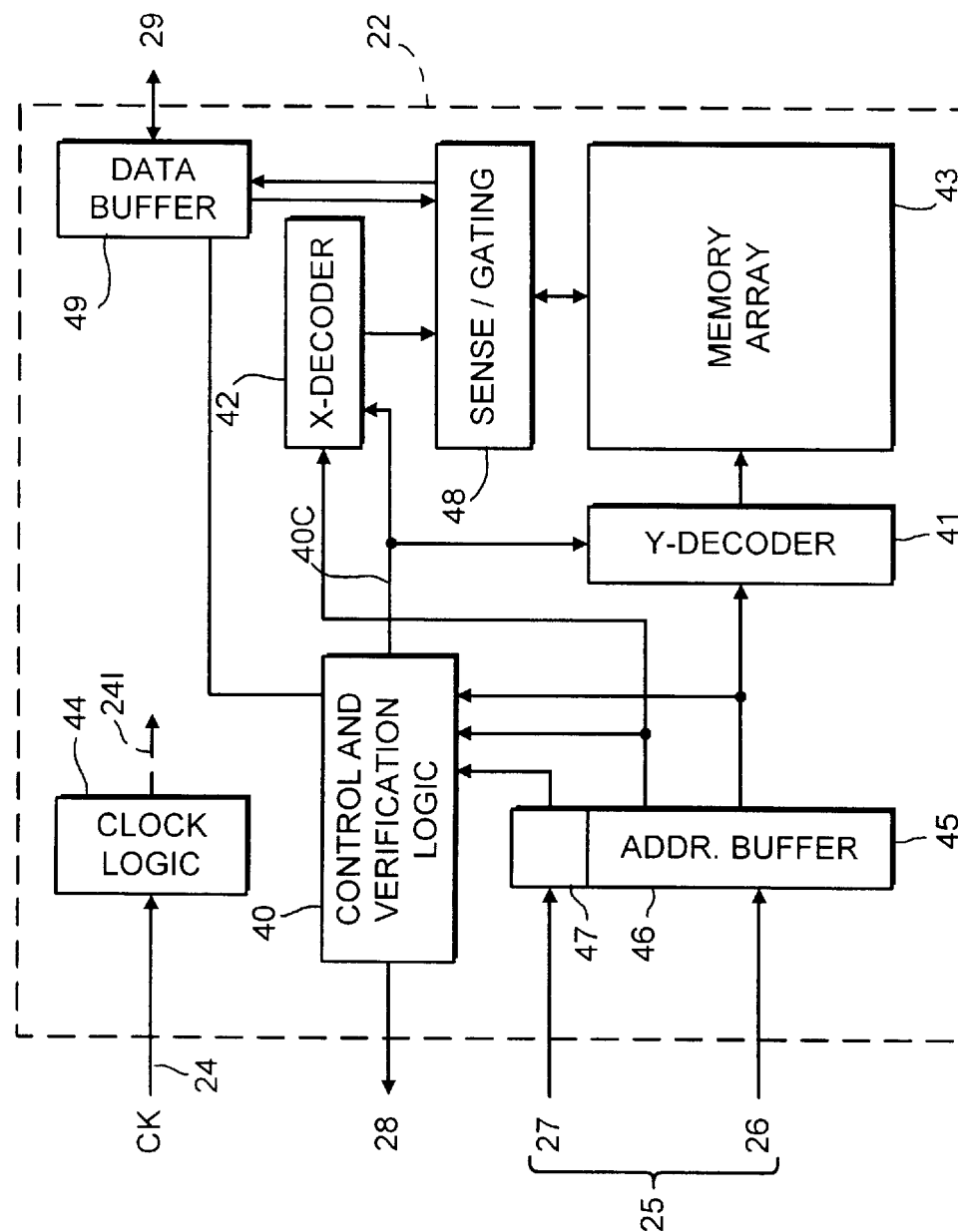
FIG. 4 is a schematic view of an alternative configuration of a memory device in accordance with the invention.

FIG. 4 is a schematic representation of an alternative example of a memory device in accordance with the present invention. Similar references are used in FIG. 4 to those used in FIG. 3. Thus, there is an address buffer 45 for a received address, including an address portion 46 for address information from the lines 26 and a verification portion 47 for verification information from the verification line(s) 27 of the address bus 25. Control and verification logic 40 receives both the address and verification information from the address buffer 45.

In FIG. 4. the address information from the address portion 46 of the address buffer 45 is supplied directly to a Y decoder 41 and an X decoder 42. In the example of FIG. 4, the control and verification logic is operable to control the operation of the Y and X decoders 41 and 42 via control lines 40C. Accordingly, the control and verification operations performed by the verification logic 40 can be performed in parallel with the Y decoding and X decoding operations in the Y decoder 41 and X decoder 42. Where the address verification is positive, the control and verification logic 40 can enables the decoded addresses from the Y and X decoders 41 and 42 to be applied to the memory array 43 for addressing a location or locations within the memory array 43.

Signals can also be supplied to the data buffer 49 to enable writing of information from the data buffer 49 to the address location or locations 43 in the case of a write instruction, or reading of data from the address location or locations in the memory array 43, in the case of a read operation. If, however, the address verification operation is negative, that is the address does not check out and there is an error in the address or the verification information, then the output of the decoded address signals from the Y and X decoders 41 and 42 is prevented. This can be achieved by selectively disabling gates at the outputs of the Y and X decoders 41 and 42, thereby preventing addressing of the memory location in the memory array 43. By providing simultaneous decoding and address verification any impact on overall performance due to the verification operations can be minimised.

As with the example of FIG. 3, an error signal can optionally be provided on the optional error line 28. Also, as with the example of FIG. 3, the details of the memory array 43 can be conventional enabling writing and/or reading, with control thereof being provide in response to a write/read signal supplied to the control and verification logic 40 from the data bus 29. Thus, appropriate sense and gating circuitry 48 can be provided in a conventional manner. In FIG. 4, for reasons of clarity, the internal clock signals lines CKI have not been shown.

However, what is shown is a connection between the control and verification logic and the data buffer 49. Optionally, therefore, verification of the data supplied to the data buffer can be affected by the control and verification logic. The results of verification using parity, EDC or ECC can be performed in the same manner as for the received addresses. The storage of data in the case of an error being detected in the received data can therefore be prevented, if desired, by inhibiting the output from the data buffer 49. It should be noted that the memory device of FIG. 3 could also be modified to include verification of the received data.

Figure 5:
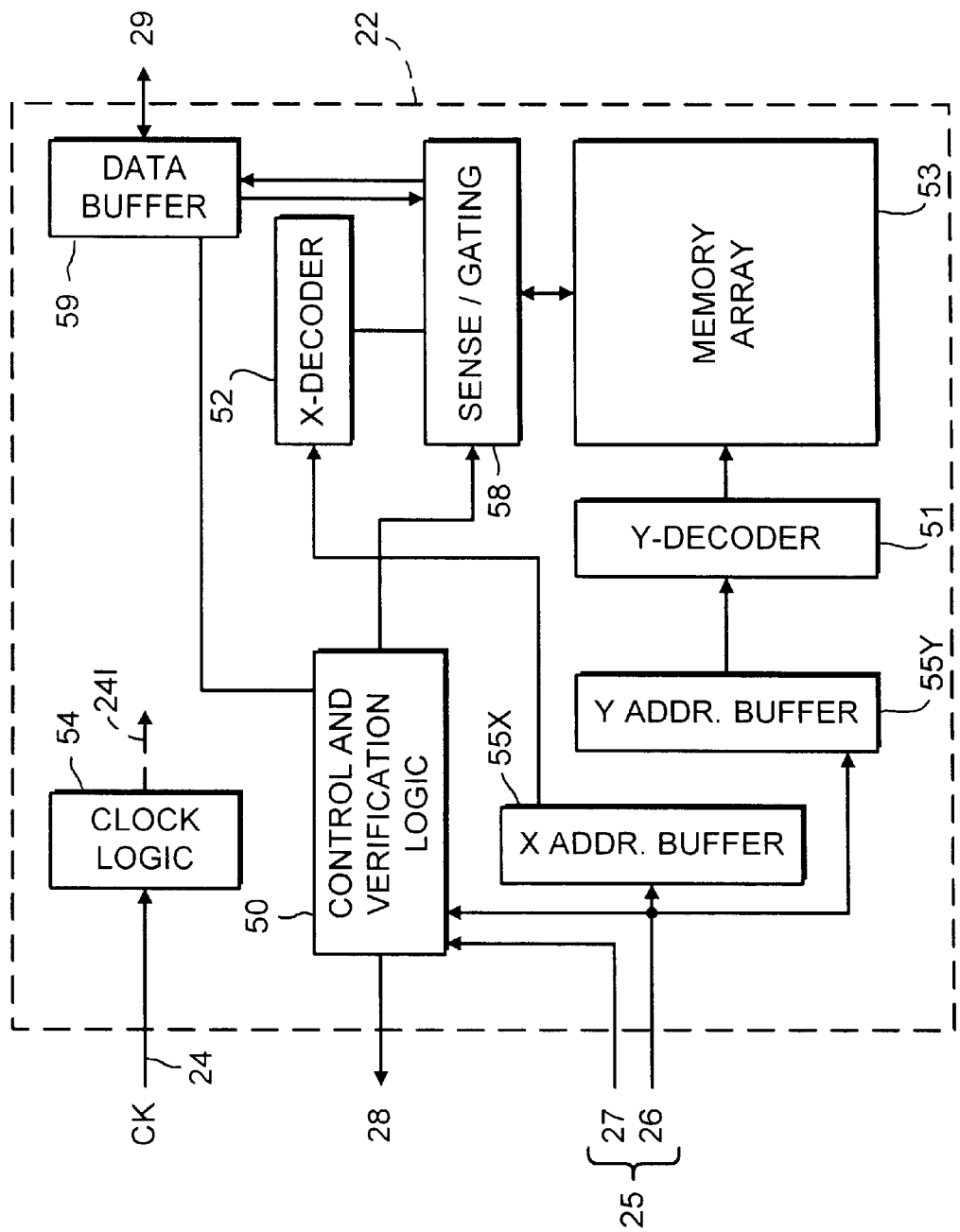
FIG. 5 is a schematic view of a further example of a memory device in accordance with the invention.

FIG. 5 is a schematic overview of a further example of a memory device according to an embodiment of the invention. In FIG. 5, similar reference numerals are used to those in the earlier embodiments. In FIG. 5, separate Y and X address buffers 55X and 55Y are provided. In this case the address buffers only receive the active address portion from the lines 26 and do not receive the address verification portion from the line(s) 27. Both the active address portion from the lines 26 and the address verification portion from the line(s) 27 are supplied to the control and verification logic 50. A Y decoder 51 and X decoder 52 are connected to receive the address information from the Y and X address buffers 55Y and 55X, respectively. A data buffer 59 is used for receiving write data from the data bus 29 and for buffering read data for supply to the data bus 29. A data in/data out signal determining whether a write or a read operation is to be performed is applied from the data bus 29 to the verification logic 50. The control and verification logic 50 also receives one or more clock signals on lines 24 for controlling the timing of the operation of the memory device 22.

The embodiment of FIG. 5 also differs from that of FIG. 4 in that in FIG. 5, the control of the access to the memory is achieved by directly controlling the sense and gating circuitry 58. Accordingly, in an embodiment to the invention as shown in FIG. 5, the speed of operation of the memory array may be further improved in that addressing of the memory array by the Y decoder 51 and the X decoder 52 can always be enabled, control of whether data is input to or output from the memory array 53 being instead achieved by the control and verification logic 50 controlling the operation of the sense and/or gating circuitry 58. This can reduce delays in operation of the memory device.

Typically, today, a memory device does not comprise a single block of memory in a single memory array such as memory array 53 of FIG. 5. Typically, the memory array is divided into a number of memory banks with each bank being represented by a memory array. Such a structure is represented schematically in FIG. 6. The provision of an array of this type is to improve the speed of access to the individual locations within the memory array by avoiding excessively long lines within the memory array which would lead to unacceptable signal delays due to capacative and other effects. Similar reference signs are used in FIG. 6 to those used in the earlier figures. However, a more detailed schematic overview of the array is shown.

Figure 6:
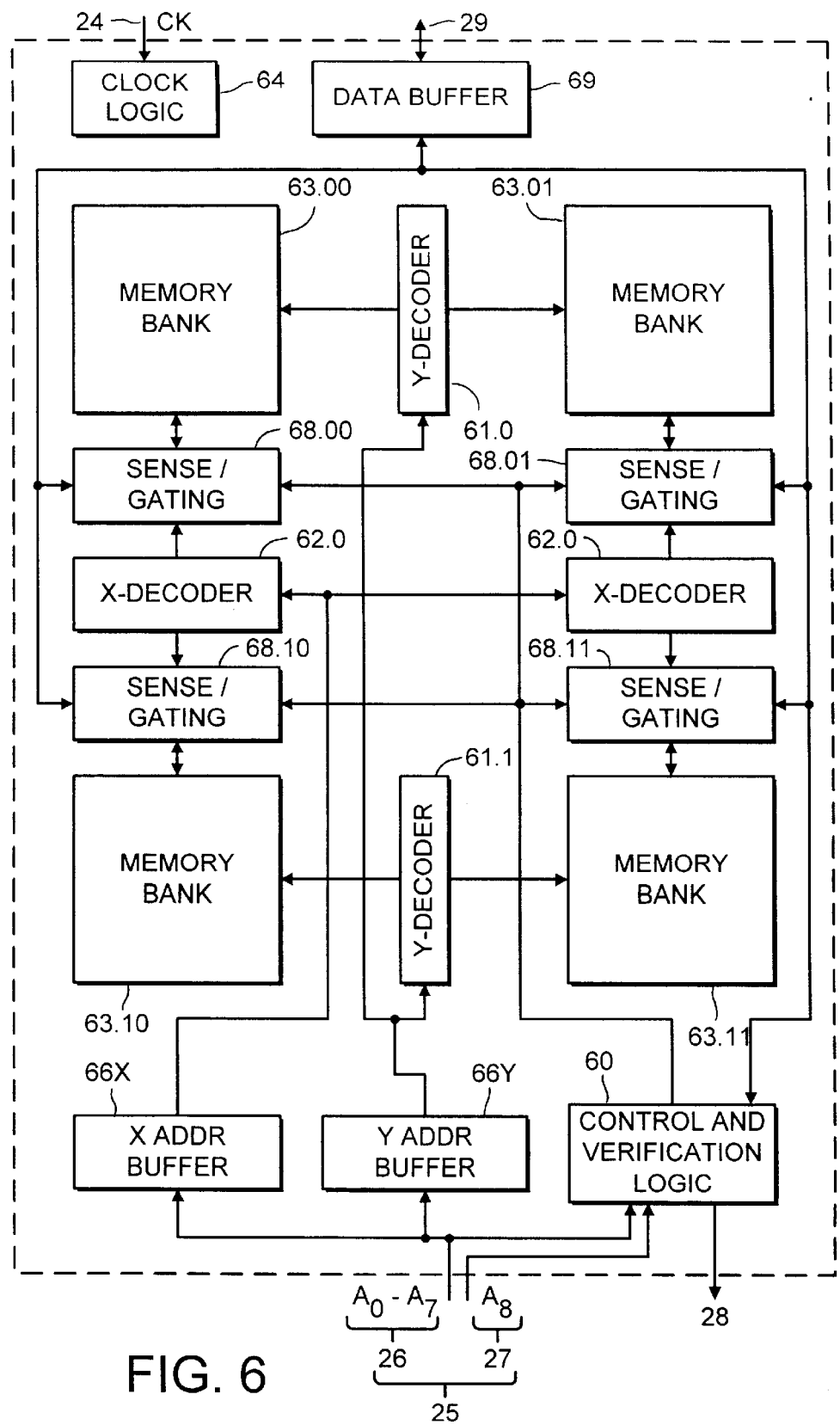
FIG. 6 is a schematic view of a further example of a memory device in accordance with the invention.

In FIG. 6, 66X and 66Y represent separate X and Y address buffers for receiving the address portion 26 (e.g. $A_0$–$A_7$ from the address bus 25). The content of the X address buffer 66X is supplied to X decoders 62.0 and 62.1. The output of the Y address buffer 66Y is supplied to Y address decoders 61.0 and 61.1. The address portion 26 (e.g. $A_0$–$A_7$) and the verification portion 27 (e.g. $A_8$) from the address bus 25 are supplied to the control and verification logic 60. Outputs from the control and verification logic 60 are supplied to the sense and gating circuitry 68.00, 68.01, 68.10 and 68.11 for selectively enabling access to the memory banks 63.00, 63.01, 63.10 and 63.11, respectively. A data buffer 69 connected to the data bus 29 is also connected to the sense and gating circuitry 68.00, 68.01, 68.10 and 68.11 for the input and output of data signals. An optional error line 28 is also provided from the output of the control and verification logic 60 for optionally indicating an error when the address verification is negative. In overall operation, the example of FIG. 6 is substantially the same as that of FIG. 5 with selective gating of the sense and gating circuitry 68.00, 68.01. 68.10 and 68.11 to enable writing to an address memory location or locations or reading from an address memory location or locations where address verification is positive, and preventing writing to or reading from an address memory location where address verification is negative. As in FIG. 5, internal clock signal and other control lines are not shown for reasons of clarity.

Figure 7:
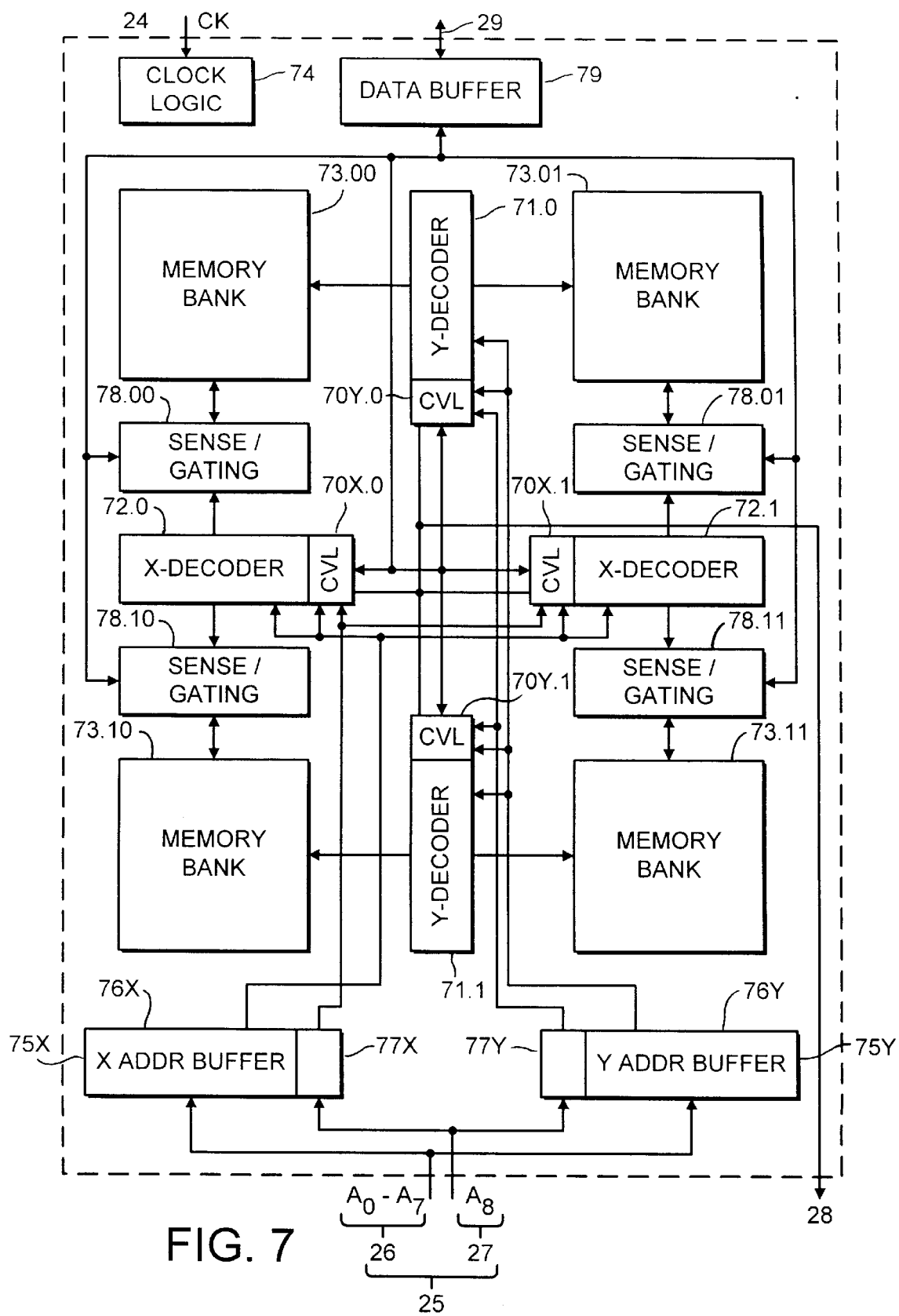
FIG. 7 is a schematic overview of a further example of a memory device in accordance with the invention.

FIG. 7 is a schematic overview of an alternative embodiment of the memory device of FIG. 6 where the address verification is provided at the memory bank level, rather than at the level of the device as a whole. It will be noted that similar reference signs are used in FIG. 7 to those used in FIG. 6. Thus, 75X represents an X address buffer and 75Y represents a Y address buffer. In FIG. 7, it will be noted that separate address portions 76X, 76Y and verification portions 77X, 77Y are provided in the X and Y address buffers 75X and 75Y. Also, it will be noted that the control and decode logic is distributed at the memory array level in separate control blocks 70Y.0, 70Y.1, 70X.0 and 70X.1. Signals from both the address portion 76X and the verification portion 77X of the address buffer 75X are supplied to the control and verification logic 70X.0 and 70X.1. However, only the address portion 76.X of the X address buffer 75X is supplied to the X decoders 72.0 and 72.1. Similarly, signals from the address portion 76Y and verification portion 77Y of the Y address buffer 75Y are supplied to the control and verification logic 70Y.0 and 70Y.1. However, only signals from the address portion 76Y of the Y address buffer 75Y are supplied to Y decoders 71.0 and 71.1. In FIG. 7, the Y decoders 71.0 and 71.1 are controlled by the Y control and verification logic 70Y.0 and 70Y.1, respectively, for enabling the controlled output of decoded address signals to the memory banks 73.00/73.01 and 73.10/73.11, respectively. Similarly, the X decoders 72.0 and 72.1 are controlled by control and verification logic 70X.0 and 70X.1, respectively, for enabling the controlled output of decoded address signals to the sense and gating circuitry 78.00/78.10 and 78.01/78.11, respectively for controlled access to the memory banks 73.00/73.10 and 73.01/73.11, respectively.

A D in/D out signal is supplied from the data buffer 79 to the control and verification logic 70Y.0, 70X.0, 70Y.1. 70X.1. An error signal can be optionally provided on the error line 28 from the control and verification logic 70Y.0, 70X.0, 70Y.1 and/or 70X.1 where address verification is negative.

Accordingly, in the present example, as in the previous examples, the control and verification logic enables selective access to a memory location or locations for writing data to the location or locations, or reading data from the location or locations, where address verification is positive, and for preventing access and/or input or output of data to or from the memory locations where address verification is negative.

It will be appreciated that any appropriate number of memory banks for a particular memory configuration can be provided. Also, control and verification of the addresses can be provided at various levels within the memory device. Thus, for example, a combination of elements from FIGS. 6 and 7 may be provided. It should further be noted that the examples shown in FIGS. 6 and 7 are merely illustrative, and the arrangement of the control and verification logic can be provided in different ways in accordance with the desired implementation to provide address verification at an appropriate level within the memory device.

Indeed, it should be noted that any reasonable combinations of features from the various embodiments is possible within the scope of the present invention, these embodiments being merely presented as examples of various options within the scope of the invention.

Thus, merely by way of example, the direct control of the sense and gating circuitry could be provided by the distributed control and verification logic of FIG. 7, in the manner shown in FIG. 6.

Also, by way of example, in any of the examples, if the data supplied to the memory device is word based, it would also be possible to include verification logic within the memory device for checking the accuracy of the data to be stored as has been described with reference to FIG. 4. Accordingly, suitable control and verification logic could be connected to the data buffer shown in the various diagrams to verify the validity of the data on the basis of verification information (e.g. parity or ECC information) supplied with the data.

Figure 8:
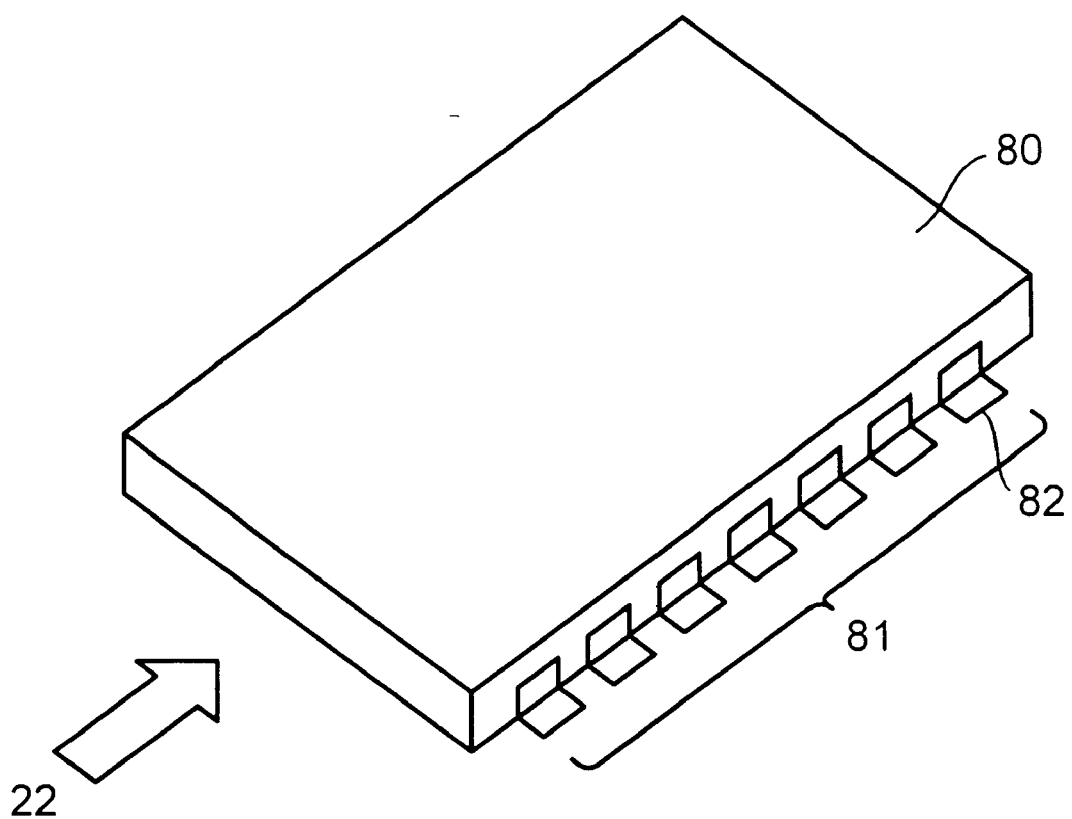
FIG. 8 is a perspective view of a memory device in accordance with the invention.

FIG. 8 is a schematic overview of an encapsulated memory device in accordance with the present invention. As shown in FIG. 8, the memory device 22 is encapsulated in a package 80 with a plurality of contact pins 81, of which one pin may be for the error signal line 28. This could be provided as a separate pin 82, or the function of the error line could be provided with other functions on a specific pin. It should be noted that although the term pin has been used here, the device contacts could be in any suitable form, typically in a form for surface mounting, and may have any configuration appropriate to the packaging technology used.

An embodiment of the present invention can provide verification of addresses within memory devices and can therefore enhance the security of operation of the memory devices. As well as providing a way of checking the normal operation of a memory device, address verification in an embodiment to the present invention can also be used for verifying the performance limits of a device by, for example, increasing the speed of access to the device until errors start to occur. Also, it could enable the provision of memory devices with dynamic memory access speed, wherein, a computer system incorporating such memory devices could be configured to set the speed of operation of the memory (by adjusting the clocks to the memory) to a point just below that at which errors start to occur.

Although particular examples of memory devices in accordance with the present invention have been described, it will be appreciated that the present invention is not limited thereto. Many additions and/or modifications to the embodiments described are possible, including combining features from individual embodiments, as has been mentioned above. Thus, although particular embodiments of the invention have been described, many modifications/additions and/or substitutions may be made within the spirit and scope of the present invention as defined in the appended claims.

What is claimed is:

1. A solid state memory device comprising:
   a plurality of addressable memory locations;
   an address port operable to receive an address identifying at least one memory location and an associated verification information for verifying the address;
   decoding logic connected to the address port and operable to respond to said received address to decode the address; and
   verification logic connected to the address port and operable to respond to said received address and associated verification information to verify the received address by checking for internal consistency between said received address and said associated verification information.

2. The memory device of claim 1 wherein the verification logic is operable to prevent access to the memory locations where address verification is negative.

3. The memory device of claim 1, wherein, for a read operation, the verification logic is operable to prevent output from the device of the content of an addressed memory location where address verification is negative.

4. The memory device of claim 1, wherein, for a write operation, the verification logic is operable to prevent modification of any memory location where address verification is negative.

5. The memory device of claim 1, wherein the verification logic is operable to inhibit the output of the decoding logic where address verification is negative.

6. The memory device of claim 1, wherein the verification logic is operable to indicate an error where address verification is negative.

7. The memory device of claim 6, comprising an error output for returning an error signal where address verification is negative.

8. The memory device of claim 1, wherein the verification information comprises an error detecting code.

9. The memory device of claim 1, wherein the verification information comprises an error correcting code.

10. The memory device of claim 9, wherein the verification logic is operable to correct an invalid address based on the error correcting code, where possible.

11. The memory device of claim 1, wherein the address port comprises a plurality of device contacts.

12. The memory device of claim 1, comprising a data port for receiving write data associated with a received address and a data register for holding write data pending verification of the received address.

13. The memory device of claim 12 wherein:
the write data includes associated data verification information for verifying the data; and
the verification logic is responsive to the received write data and data verification information to verify the received write data, and to prevent storage of that write data where verification is negative.

14. The memory device of claim 1 in the form of an integrated memory chip.

15. The memory device of claim 14, comprising a plurality of memory banks and decoding logic and verification logic associated with the memory banks.

16. A solid state memory device comprising:
a plurality of addressable memory locations;
a data port for receiving data for storage in at least one memory location including associated data verification information for verifying the data; and
verification logic responsive to received data and data verification information to verify the received data by checking for internal consistency between said received data and said associated data verification information and to prevent storage of that data where verification is negative.

17. A computer system:
comprising a processor;
a bus connected to the processor and including address lines and verification information lines, whereby an address is issued to the bus with associated verification information for verifying the address;
a memory controller connected to the bus; and
at least one solid state memory device connected to the memory controller, the memory device including:
a plurality of addressable memory locations;
an address port for receiving an address and the associated verification information;
address decode logic responsive to the received address for decoding the received address; and
verification logic responsive to the received address and the associated verification information for verifying the received address by checking for internal consistency between said received address and said associated verification information.

18. The computer system of claim 17, wherein the verification logic is operable to prevent access to the memory locations where address verification is negative.

19. The computer system of claim 17, wherein, for a read operation, the verification logic is operable to prevent output from the device of the content of an addressed memory location where address verification is negative.

20. The computer system of claim 17, wherein, for a write operation, the verification logic is operable to prevent modification of any memory location where address verification is negative.

21. The computer system of claim 17, wherein the verification logic is operable to inhibit the output of the decoding logic where address verification is negative.

22. The computer system of claim 17, wherein the verification logic indicates an error where address verification is negative.

23. The computer system of claim 22, wherein the memory device comprises an error output for returning an error signal where address verification is negative.

24. The computer system of claim 23, wherein the bus comprises an error line for the error signal.

25. The computer system of claim 17, wherein the verification information comprises an error detecting code.

26. The computer system of claim 17, wherein the verification information comprises an error correcting code.

27. The computer system of claim 26, wherein the verification logic is operable to correct an invalid address based on the error correcting code, where possible.

28. The computer system of claim 17, wherein the address port comprises a plurality of device contacts.

29. The computer system of claim 17, wherein the memory device is a solid state memory chip.

30. The computer system of claim 17, comprising a data port for receiving write data associated with a received address and a data register for holding write data pending verification of the received address.

31. The computer system of claim 30, wherein:
the write data includes associated data verification information for verifying the data; and
the verification logic is responsive to the received write data and data verification information to verify the received write data, and to prevent storage of that write data where verification is negative.

32. A method of addressing a memory location within a solid state memory device comprising:
receiving an address at the memory device with associated verification information for verifying the address; and
verifying with the use of said verification information the received address within the memory device by checking for internal consistency between said received address and said associated verification information.

33. The method of claim 32, including a step of preventing access to the memory locations where address verification is negative.

34. The method of claim 32, including a step of preventing output from the memory device of the content of an addressed memory location where address verification is negative.

35. The method of claim 32, including a step of preventing modification of any memory location where address verification is negative.

36. The method of claim 32, including a step of returning an error signal where address verification is negative.

37. The method of claim 32, comprising retrying addressing of the memory location.

38. The method of claim 32, wherein the verification portion comprises an error detecting code.

39. The method of claim 32, wherein the verification portion comprises an error correcting code.

40. The method of claim 39, comprising a step of correcting the address portion based on the error correcting code, where possible.

41. The method of claim 32, wherein the memory device includes a plurality of memory banks and the verification step is performed at least at a memory bank level.

* * * * *